United States Patent [19]

Janssen et al.

[11] 4,449,796
[45] May 22, 1984

[54] STREAMLINED ADJUSTABLE EXTERIOR REARVIEW MIRROR

[75] Inventors: Lutz J. Janssen, Munich; Patrick Le Quement, Cologne, both of Fed. Rep. of Germany

[73] Assignee: Ford Motor Company, Dearborn, Mich.

[21] Appl. No.: 401,448

[22] Filed: Jul. 26, 1982

[30] Foreign Application Priority Data

Aug. 17, 1981 [DE] Fed. Rep. of Germany ....... 3132400

[51] Int. Cl.³ .......................... G02B 5/08; G02B 7/18
[52] U.S. Cl. .................................. 350/582; D12/189
[58] Field of Search ............... 350/584, 582, 590, 587, 350/580, 307; D12/187–189; 248/481, 482, 483

[56] References Cited

U.S. PATENT DOCUMENTS 3,598,469 8/1971 Landen ................................ 350/584

FOREIGN PATENT DOCUMENTS 1028898 4/1958 Fed. Rep. of Germany ...... 350/582
1035499 7/1958 Fed. Rep. of Germany ...... 350/584
2511290 9/1975 Fed. Rep. of Germany ...... 350/584
2704226 8/1978 Fed. Rep. of Germany ...... 350/582
2058695 4/1981 United Kingdom ................ 350/584

Primary Examiner—Jon W. Henry
Attorney, Agent, or Firm—Daniel M. Stock; Clifford L. Sadler

[57] ABSTRACT

Exterior rear-view mirror for motor vehicles, with a streamlined housing and with a mirror adjustable therein.

In an exterior rear-view mirror for motor vehicles, with a streamlined housing and with a mirror adjustable therein, the flow round which is improved via air-guide devices located on the housing in the form of air-guide surfaces, the streamlined housing (3, 5) is arranged, in a manner known per se, to rest against the front side window (2) and consists of a fixed housing part (5) circumscribing the mirror surface (4) and of a movable housing part (6) adjoining said fixed housing part and carrying the mirror (4), the fixed housing part (5) being provided, especially in its lower region, with an air-guide surface, the movable housing part (6) having a drawn-in outer contour and the air-guide surface (8) being arranged to prevent separation from this outer contour.

2 Claims, 4 Drawing Figures

STREAMLINED ADJUSTABLE EXTERIOR REARVIEW MIRROR

BACKGROUND OF THE INVENTION

The invention relates to an exterior rear-view mirror for motor vehicles, with a streamlined housing and with a mirror adjustable therein, the flow round which is improved via air-guide devices located on the housing in the form of air-guide surfaces.

An exterior rear-view mirror of this type is already known from German Auslegeschrift No. 1,028,898, in which air-guide surfaces having a wing-shaped or pear-shaped cross-section are arranged on a streamlined housing so as to surround the housing edge, in order to reduce the wake region behind the mirror. In this arrangement, the streamlined housing is arranged on a mirror foot on which it is adjustable relative to the body contour, as a result of which the housing can be brought into a position in which air impinges on it in an unfavorable manner and the air resistance of the motor vehicle is increased.

A further exterior rear-view mirror of the type mentioned in the introduction is known from Germany Auslegeschrift No. 1,035,499, which has essentially the same disadvantages applying to this, and, furthermore, because the air-guide surfaces deflect the air stream by 90° parallel to the mirror surface, the air resistance of the motor vehicle is additionally increased.

SUMMARY OF THE INVENTION

The object of the invention is to design an exterior rear-view mirror of the type mentioned in the introduction in such a way that the increase in total air resistance of the motor vehicle, caused by the exterior rear-view mirror, is kept as small as possible.

The invention starts from an exterior rear-view mirror arrangement, such as is to be found, for example, in German Auslegeschrift No. 2,704,226, and in which a streamlined housing is arranged, in a manner known per se, to rest against a front side window.)

A housing through which air partially flows is known from German Utility Model 80 30,528, but in this the air stream, again deflected, is guided parallel to the mirror surface.

Because the streamlined housing is arranged, in a manner known per se, to rest against the front side window and consists of a fixed housing part circumscribing the mirror surface and of a movable housing part adjoining said fixed housing part and carrying the mirror, the fixed housing part being provided, especially in its lower region, with an air-guide surface, the movable housing part having a drawn-in outer contour and the air-guide surface being arranged to prevent separation from this outer contour, the increase in the air resistance of the motor vehicle caused by the flow round the exterior rear-view mirror is kept to a negligible minimum. As a result of the perfect flow round the exterior rear-view mirror which is achieved in this way, not only is a reduction in air resistance obtained, but, because of the considerably reduced wake zone of the mirror, soiling of the mirror surface and of the adjacent side window is also reduced.

BRIEF DESCRIPTION OF THE DRAWINGS

The invention is explained in more detail with reference to an exemplary embodiment illustrated in the attached drawings in which.

DESCRIPTION OF A PREFERRED EMBODIMENT

Figure 1:
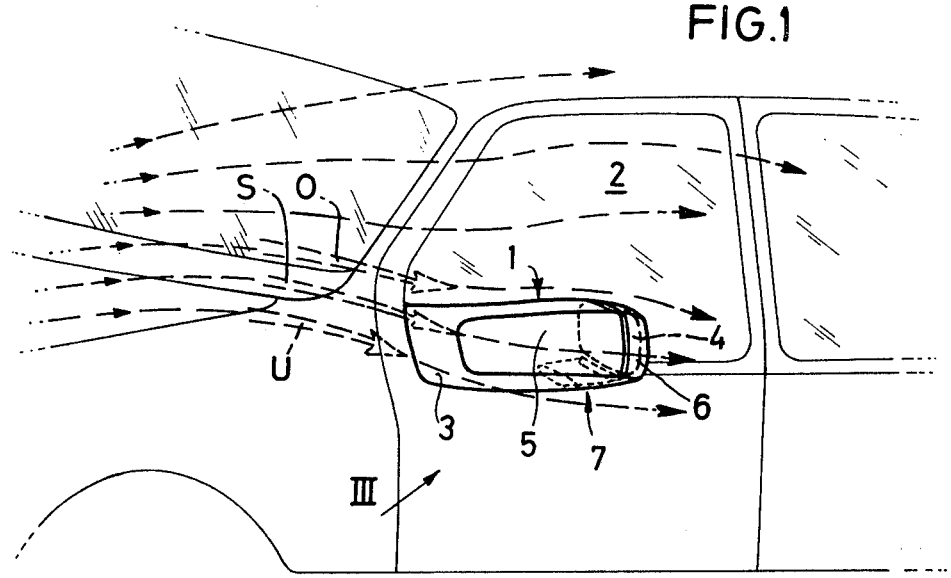
FIG. 1 shows an oblique front view of an exterior rear-view mirror according to the invention, with the impingement conditions arising from the front part of the motor vehicle and from the windscreen.
Figure 2:
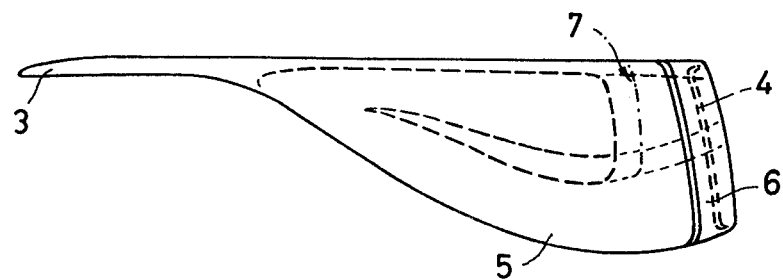
FIG. 2 shows a plan view of an exterior rear-view mirror according to FIG. 1.
Figure 3:
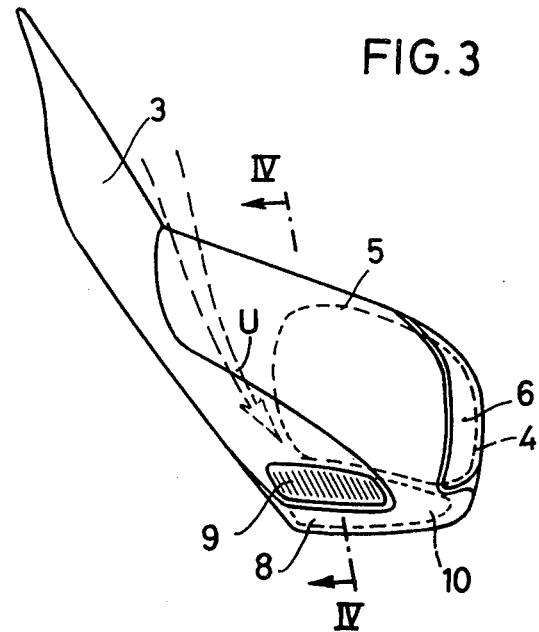
FIG. 3 shows an oblique view from the bottom front of an exterior rear-view mirror according to FIG. 1.

In FIG. 1, an exterior rear-view mirror 1 is arranged to rest against the front side window 2 of a motor vehicle. The exterior rear-view mirror 1 consists essentially of a streamlined mirror foot 3, fixed housing part 5 circumscribing the mirror surface 4, and a movable housing part 6 adjoining the fixed housing part and carrying the mirror 4.

As air emerges from the flow impingement onto the exterior rear-view mirror, indicated in FIG. 1 by arrows, O, S and U, the upper and lateral flow round the exterior rear-view mirror can be kept free of separation by means of an appropriate streamined design of the fixed housing part 5.

The flow impingement onto the exterior rear-view mirror 1 corresponding to the flow arrow U, resulting from the flow over the front and from the flow around the windscreen and directed sideways and downwards, would, in the case of a fixed housing part 5, which is kept small in the interests of the overall resistance, lead, approximately in the region 7 indicated by broken lines, to a separation of the flow and consequently to an increased wake zone and increased air resistance.

Consequently, there is provided, in the lower region of the fixed housing part 5, an air-guide surface 8 which forms, in the region where there is danger of separation, a channel 11 which extends between an inflow orifice 9 and an outflow orifice 10 and which causes a deflection and acceleration of the air stream in danger of separation, until it comes in contact again with the adjoining movable housing part 6.

Figure 4:
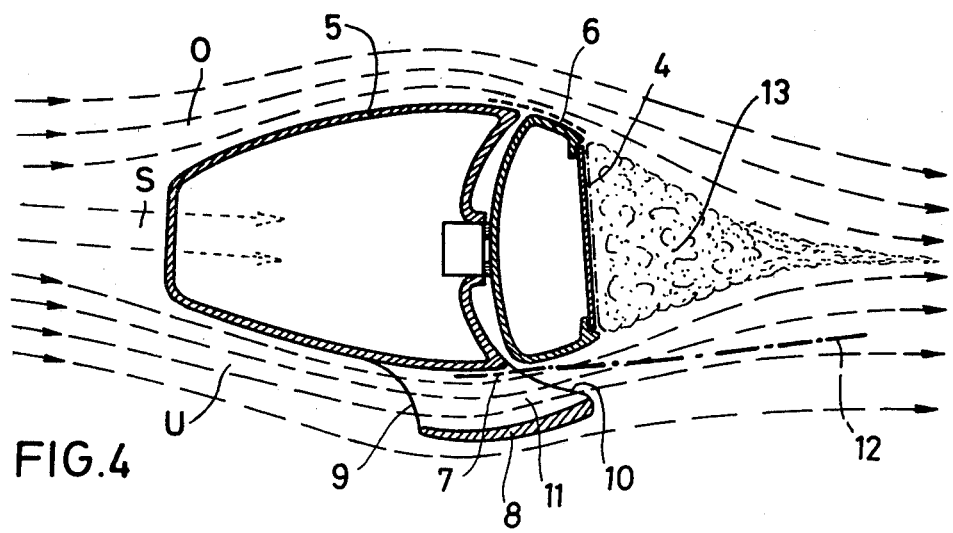
FIG. 4 shows a vertical section along the line IV—IV in FIG. 3.

The conditons of flow in the region of the exterior rear-view mirror according to the invention can be seen especially favorably in FIG. 4. It can be observed that the upper flow O flows over the fixed housing part 5 free of separation and is also favorably adapted to the adjoining movable housing part 6 as a result of the slightly drawn-in outer contour of the latter.

However, because its direction is inclined downwards in view of the fact that the mirror surface carried by the movable housing part 6 must be inclined to the viewing direction of the driver, the lower flow U would lead to separation in the region of the dot-and-dash line 7. This would lead to an excessively large wake zone 12 indicated by dashed lines.

As a result of the arrangement according to the invention of the air-guide surface 8, the lower flow U, picked up by the inflow orifice 9 before it separates, is deflected slightly and accelerated in the channel 11, so that, in the region of the outflow orifice 10, it stays close to the drawn-in outer contour of the movable housing part 61 In this way, a substantially smaller wake zone 13 is obtained, as a result of which a considerable reduction in the air resistance and a reduction in the soiling of the mirror surface 4 and the adjacent parts of the front side window 2 are acheived.

Because the flow round an exterior rear-view mirror is made optimum according to the invention, the increase in the air resistance of the motor vehicle normally associated with the arrangement of a conventional exterior rear-view mirror can be reduced substantially or reduced to a third of the air resistance measured hitherto for such a mirror. Furthermore, because of the substantially smaller wake zone, a reduction in the soiling of the mirror surface and of the front side window is to be expected.

We claim:

1. An exterior rear-view mirror for motor vehicles, having a streamlined housing including a mirror adjustable therein, and wherein the flow around the rear-view mirror is improved by air-guide devices located on the housing in the form of air-guide surfaces, characterized in that the streamlined housing is arranged to rest against the front side window and consists of a fixed housing part circumscribing the mirror and of a movable housing part adjoining said fixed housing part and carrying the mirror, the fixed housing part being provided, at least in its lower region, with an air-guide surface, and the movable housing part having a drawn-in outer contour and the air-guide surface being arranged to prevent air flow separation from this outer contour.

2. An exterior rear-view mirror according to claim 1, characterizewd in that the air-guide surface has an inflow orifice and an outflow orifice, and a channel defined therebetween, said channel being positioned to contain the region adjacent said housing wherein said air flow separation impends.

* * * * *